(12) United States Patent
Ota et al.

(10) Patent No.: US 7,406,401 B2
(45) Date of Patent: Jul. 29, 2008

(54) SENSOR MANAGER DEVICE, COMPUTER PROGRAM FOR CONTROLLING SENSOR MANAGER DEVICE, COMPUTER-READABLE STORAGE MEDIUM CONTAINING COMPUTER PROGRAM, AND METHOD CONTROLLING SENSOR MANAGER DEVICE

(75) Inventors: Shunji Ota, Kyoto (JP); Yoshiyuki Otsuki, Kyoto (JP); Masayuki Oyagi, Kyoto (JP); Yoshihiko Fukushima, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 633 days.

(21) Appl. No.: 10/491,548

(22) PCT Filed: Oct. 1, 2002

(86) PCT No.: PCT/JP02/10237

§ 371 (c)(1),
(2), (4) Date: Apr. 2, 2004

(87) PCT Pub. No.: WO03/032273

PCT Pub. Date: Apr. 17, 2003

(65) Prior Publication Data

US 2004/0249590 A1  Dec. 9, 2004

(30) Foreign Application Priority Data

Oct. 4, 2001  (JP) ............................. 2001-309087

(51) Int. Cl.
*G06F 15/00* (2006.01)
(52) U.S. Cl. ....................... 702/188; 718/102
(58) Field of Classification Search ............. 702/79–80, 702/176–178, 187–189; 718/102–106
See application file for complete search history.

(56) References Cited

U.S. PATENT DOCUMENTS

| | | | | |
|---|---|---|---|---|
| 5,958,009 A | * | 9/1999 | Friedrich et al. | ............ 709/224 |
| 6,003,079 A | * | 12/1999 | Friedrich et al. | ............ 709/224 |
| 6,071,382 A | * | 6/2000 | Tsuchiya et al. | ............ 162/252 |
| 6,078,255 A | * | 6/2000 | Dividock et al. | ......... 340/539.1 |
| 6,440,067 B1 | * | 8/2002 | DeLuca et al. | .............. 600/300 |
| 6,513,022 B1 | * | 1/2003 | Morgan | ....................... 706/16 |
| 6,600,421 B2 | * | 7/2003 | Freeman | .................. 340/573.1 |

FOREIGN PATENT DOCUMENTS

JP  56-016292  2/1981

(Continued)

OTHER PUBLICATIONS

Shiraishi et al., "Designing and Implementation of Sensor Data Agent For Sensor Network Application," Extended Abstracts of 7th Workshop of Multi Agent and Cooperation Computation (MMCC 1998), Dec. 9, 1998-Dec. 11, 1998, 8 Sheets.

(Continued)

*Primary Examiner*—Hal D Wachsman
*Assistant Examiner*—Mary C Baran
(74) *Attorney, Agent, or Firm*—Foley & Lardner LLP (57) ABSTRACT

A sensor network controller (4) includes: a sensor interface (44) receiving sensing data transmitted from sensors (5); a data write section (150) writing the received sensing data and sensing time information indicating a sensing time of the sensing data in association with each other to a memory section (42); the memory section (42) storing the sensing data and the sensing time information; a first data processing section (144) generating sensing data which is at the timing designated by a client on the basis of the sensing data and the sensing time information stored in the memory section (42); and a data output section (148) outputting the generated sensing data to the client. The client is enabled to acquire sensing data in accordance with a request even if the scheme by which the sensors convey sensing data does not match with the scheme by which the client makes a request for sensing data.

13 Claims, 5 Drawing Sheets

FOREIGN PATENT DOCUMENTS

| | | |
|---|---|---|
| JP | 64-041100 | 2/1989 |
| JP | 02-277396 | 11/1990 |
| JP | 05-197892 | 8/1993 |
| JP | 06-189009 | 7/1994 |
| JP | 07-057176 A | 3/1995 |
| JP | 07-244175 | 9/1995 |
| JP | 10-069498 | 3/1998 |
| JP | 11-110454 | 4/1999 |
| JP | 11-177611 | 7/1999 |
| JP | 2000-020556 A | 1/2000 |
| JP | 2000-132222 | 5/2000 |
| JP | 2000-249452 | 9/2000 |
| JP | 2000-330628 | 11/2000 |
| JP | 2001-014579 | 1/2001 |

OTHER PUBLICATIONS

Kohno et al., "Components of an Adaptive Sensor Network," Journal of Japanese Society of Electronic Information and Communication A, vol. J82-A, No. 3, Mar. 1999, pp. 454-462.

* cited by examiner

FIG. 2

```
                    ┌─ 1
    ┌───────────────┴──────────────────────┐
    │         SENSOR NETWORK SYSTEM        │
    │       ┌──────────────┐               │
    │   2 ──│   CENTRAL    │               │
    │       │  APPARATUS   │               │
    │       └──────┬───────┘               │
    │              ↕                     6 │
    ├──────────────┬───────────────────────┤
    │              ↕                       │
    │       ┌──────────────┐               │
    │       │    SENSOR    │               │
    │       │   NETWORK    │               │
    │       │   SENSOR     │               │
    │       │   NETWORK    │─ 4  ┌───────┐ │
    │       │  CONTROLLER  │     │SENSOR │ │
    │       └──────────────┘     │NETWORK│ │
    │         5        5         └───┬───┘ │
    │      ┌──────┐ ┌──────┐         3b    │
    │      │SENSOR│→│SENSOR│               │
    │      └──────┘ └──────┘               │
    │         5        5                   │
    │      ┌──────┐ ┌──────┐       ─ 3a    │
    │      │SENSOR│→│SENSOR│               │
    │      └──────┘ └──────┘               │
    │         5        5                   │
    │      ┌──────┐ ┌──────┐               │
    │      │SENSOR│→│SENSOR│               │
    │      └──────┘ └──────┘               │
    └──────────────────────────────────────┘
```

| SOURCE ID | DESTINATION ID | SENSOR ID | DATA REQUEST SCHEME | PARAMETER |
|---|---|---|---|---|
| | | | | |

FIG. 7

| | | DATA REQUEST SCHEME | | |
|---|---|---|---|---|
| | | CYCLIC | EVENT-RESPONSIVE | REQUEST-RESPONSIVE |
| SENSOR TYPE | CYCLIC | A | B | C |
| | EVENT-RESPONSIVE | D | E | F |
| | REQUEST-RESPONSIVE | G | H | I |

SENSOR MANAGER DEVICE, COMPUTER PROGRAM FOR CONTROLLING SENSOR MANAGER DEVICE, COMPUTER-READABLE STORAGE MEDIUM CONTAINING COMPUTER PROGRAM, AND METHOD CONTROLLING SENSOR MANAGER DEVICE

TECHNICAL FIELD

The present invention relates to sensor manager devices receiving sensing data from a sensor and providing data based on the sensing data to an external client.

BACKGROUND ART

A huge variety of sensors have been used in large numbers in our everyday life for some time. They are specialized for particular purposes including detection of car thefts, house break-ins, and fires. These sensors typically make up sensor networks for individual purposes. We can use information from the sensor networks to fulfill the intended purposes.

At the same time, technology is under development to utilize information from a sensor network in application software on a computer outside the network. An example is found in a paper published on Dec. 9, 1998, "Designing and implementation of sensor data agent for sensor network application," by Shiraishi You & Anzai Yuichiro, Extended Abstracts (7th Workshop, Wed., Dec. 9, 1998 to Fri. Dec. 11, 1998), MultiAgent and Cooperation Computation (MACC '98). The paper discloses a system called an "agent platform" capable of providing a flexible interface to applications utilizing the sensor network.

The agent platform is equipped with a sensor data agent working as an interface between a set of applications and a sensor network managing system (node manager) managing sensors (sensor nodes) on the sensor network and providing information from the sensors. The use of such an agent platform is intended to reduce communications between the applications and the sensor network managing system.

For a conventional application to monitor sensor activities, the application exchanges messages with the sensor network managing system through direct communication for sensor data. Under this mechanism, large numbers of messages need to be exchanged over the network to periodically update data. Therefore, when several applications request monitoring, the network traffic may not flow smoothly.

In contrast, according to the technology disclosed in the paper, monitoring is done by the application giving a predetermined task to the sensor data agent and the sensor data agent acquiring data from sensors and sending the acquired data to the application at a predetermined timing in accordance with the task. The technology is intended to reduce communications between the applications and the sensor network managing system.

In the technology disclosed in the paper, the sensor network managing system acquires sensing results by requesting values from the sensors.

However, not all typical sensors on sensor networks are of the types which report a sensing result when a value request is made as in the above. There are also types which periodically report a sensing result. Others report a sensing result when a predetermined event is detected. Thus, an inconvenience existed in conventional technology where the applications can acquire data only at limited timings as dictated by the foregoing sensors' reporting schemes.

Conceived to address the problems, the present invention has an objective to offer a sensor manager device which enables a client to acquire a sensing result in accordance with a request even if the scheme by which the sensor reports a sensing result (sensing data) does not match with the scheme by which the client makes a request for a sensing result from the sensor.

DISCLOSURE OF INVENTION

A sensor manager device in accordance with the present invention receives sensing data transmitted from a sensor and provides data based on the sensing data to an external client, where the sensor automatically performs sensing and transmits sensing data, and the client designates a timing and requests sensing data acquired by the sensor. The sensor manager device is arranged to include:

a data receiver section receiving sensing data transmitted from the sensor;

a data write section writing the received sensing data and sensing time information indicating a sensing time of the sensing data in association with each other to a memory section;

the memory section storing the sensing data and the sensing time information;

a data processing section generating sensing data which is at the timing designated by the client on the basis of the sensing data and the sensing time information stored in the memory section; and a data output section outputting the sensing data generated by the data processing section to the client.

According to the arrangement, sensing data is provided by the scheme desired by the client even when the sensor, like a cyclic sensor, automatically performs sensing and transmits sensing data independently of a request from the client, the sensing data requested by the client is cyclic, request-responsive, or of another type which is requested based on a designated timing, and the sensor type does not match with the data request scheme.

In other words, according to the arrangement, the data write section writes the automatically transmitted sensing data together with the sensing time information to a memory section. Further, the data processing section generates sensing data which is at the timing designated by the client on the basis of the sensing data and the sensing time information stored in the memory section. The data processing section generates the sensing data, for example, through interpolation. The output section then outputs the generated sensing data to the client. Thus, sensing data can be appropriately provided at a timing designated by the client.

Therefore, the use of the sensor manager device enables the client to acquire sensing data in accordance with a request even when the scheme by which the sensor conveys sensing data does not match with the scheme by which the client makes a request for sensing data, which in turn enables the construction of a sensor network system including a variety of sensors and clients.

Another sensor manager device in accordance with the present invention receives sensing data transmitted from a sensor and provides data based on the sensing data to an external client, where the sensor, when there has occurred a change in a sensing result, transmits sensing data after the change, and the client designates a timing and requests sensing data acquired by the sensor. The sensor manager device is arranged to include:

a data receiver section receiving sensing data transmitted from the sensor;

a memory section storing the received sensing data;

a data processing section acquiring latest sensing data stored in the memory section at the timing designated by the client; and a data output section outputting the sensing data acquired by the data processing section to the client.

According to the arrangement, sensing data is provided by the scheme desired by the client even when the sensor, like an event-responsive sensor, when there has occurred a change in a sensing result, transmits sensing data after the change independently of a request from the client, the sensing data requested by the client is cyclic, request-responsive, or of another type which is requested based on a designated timing, and the sensor type does not match with the data request scheme.

In other words, according to the arrangement, the sensing data transmitted from the sensor in the past can be stored in a memory section. Further, the data processing section acquires the latest sensing data written to the memory section at a timing designated by the client. Because the sensor transmits sensing data after the change when there has occurred a change in a sensing result as in the foregoing, the sensing data thus acquired appropriately represents the state of the sensing target at a timing designated by the client. The output section then outputs the acquired sensing data to the client. Thus, sensing data can be appropriately provided at a timing designated by the client.

Therefore, the use of the sensor manager device enables the client to acquire sensing data in accordance with a request even when the scheme by which the sensor conveys sensing data does not match with the scheme by which the client makes a request for sensing data, which in turn enables the construction of a sensor network system including a variety of sensors and clients.

Another sensor manager device in accordance with the present invention receives sensing data transmitted from a sensor and provides data based on the sensing data to an external client, where the sensor automatically performs sensing and transmits sensing data, and the client requests sensing data when there has occurred a change in a sensing result acquired by the sensor. The sensor manager device is arranged to include:

a data receiver section receiving sensing data transmitted from the sensor;

a memory section storing the received sensing data;

a data processing section determining whether there has occurred a change in the sensing data on the basis of the sensing data stored in the memory section, and when it is determined that there has occurred a change, acquiring sensing data after the change; and a data output section outputting the sensing data acquired by the data processing section to the client.

According to the arrangement, sensing data is provided by the scheme desired by the client even when the sensor, like a cyclic sensor, automatically performs sensing and transmits sensing data independently of a request from the client, the sensing data requested by the client requests sensing data when there has occurred a change in a sensing result acquired by, for example, an event-responsive sensor, and the sensor type does not match with the data request scheme.

In other words, according to the arrangement, the sensing data transmitted from the sensor in the past can be stored in a memory section. Further, the data processing section determines whether there has occurred a change in the sensing data on the basis of the sensing data, for example, regularly or periodically stored in the memory section, and when it is determined that there has occurred a change, acquires sensing data after the change. As discussed in the foregoing, by the data processing section checking an occurrence of a change, a change in the sensing results can be detected even when the sensor automatically performs sensing and transmits the sensing data. In an occurrence of a change, the data processing section acquires sensing data after the change, and the output section outputs the acquired sensing data to the client, thereby providing to the client sensing data when there has occurred a change in a sensing result acquired by the sensor.

Therefore, the use of the sensor manager device enables the client to acquire sensing data in accordance with a request even when the scheme by which the sensor conveys sensing data does not match with the scheme by which the client makes a request for sensing data, which in turn enables the construction of a sensor network system including a variety of sensors and clients.

Another sensor manager device in accordance with the present invention receives sensing data transmitted from a sensor and provides data based on the sensing data to an external client, where the sensor performs sensing and transmits sensing data in accordance with a sensing signal requesting a transmission of the sensing data, the client requests sensing data when there has occurred a change in a sensing result acquired by the sensor, said sensor manager device comprising:

a signal output section outputting the sensing signal to the sensor;

a data receiver section receiving the sensing data transmitted from the sensor;

a memory section storing the received sensing data;

a data processing section determining whether there has occurred a change in the sensing data on the basis of the sensing data stored in the memory section, and when it is determined that there has occurred a change, acquiring sensing data after the change; and a data output section outputting the sensing data acquired by the data processing section to the client.

According to the arrangement, sensing data is provided by the scheme desired by the client even when the sensor, like a request-responsive sensor, performs sensing and transmits sensing data in accordance with a sensing signal requesting a transmission of the sensing data, the sensing data requested by the client requests sensing data when there has occurred a change in a sensing result acquired by, for example, an event-responsive sensor, and the sensor type does not match with the data request scheme.

In other words, according to the arrangement, the signal output section, for example, regularly or periodically outputs a sensing signal, so that sensing data is obtainable from the sensor. Further, the memory section stores the received sensing data. The data processing section, for example, regularly or periodically determines an occurrence of a change in the sensing data on the basis of the sensing data stored in the memory section, and when it is determined that there has occurred a change, acquires sensing data after the change. As discussed in the foregoing, the signal output section requests sensing data, and the data processing section checks an occurrence of a change, so as to acquire the change in the sensing result. When there has occurred a change, the data processing section acquires sensing data after the change, and the output section outputs the acquired sensing data to the client, so that sensing data when there has occurred a change in the sensing result acquired by the sensor can be provided to the client.

Therefore, the use of the sensor manager device enables the client to acquire sensing data in accordance with a request even when the scheme by which the sensor conveys sensing data does not match with the scheme by which the client makes a request for sensing data, which in turn enables the construction of a sensor network system including a variety of sensors and clients.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIGS. 4(a) to 4(c) are conceptual illustrations showing examples of data communications schemes between a central apparatus and a sensor network controller in the sensor network system in FIG. 2.

BEST MODE FOR CARRYING OUT INVENTION

Referring to FIGS. 1 to 7, the following will describe an embodiment of the present invention.

(Overall Structure)

A sensor network system in accordance with the present embodiment is made up of a sensor network of multiple sensors and a central apparatus managing the sensor network. The sensor network is capable of data communications with the central apparatus via a communications network. An example of the structure of the sensor network system is shown in FIG. 2.

Figure 2:
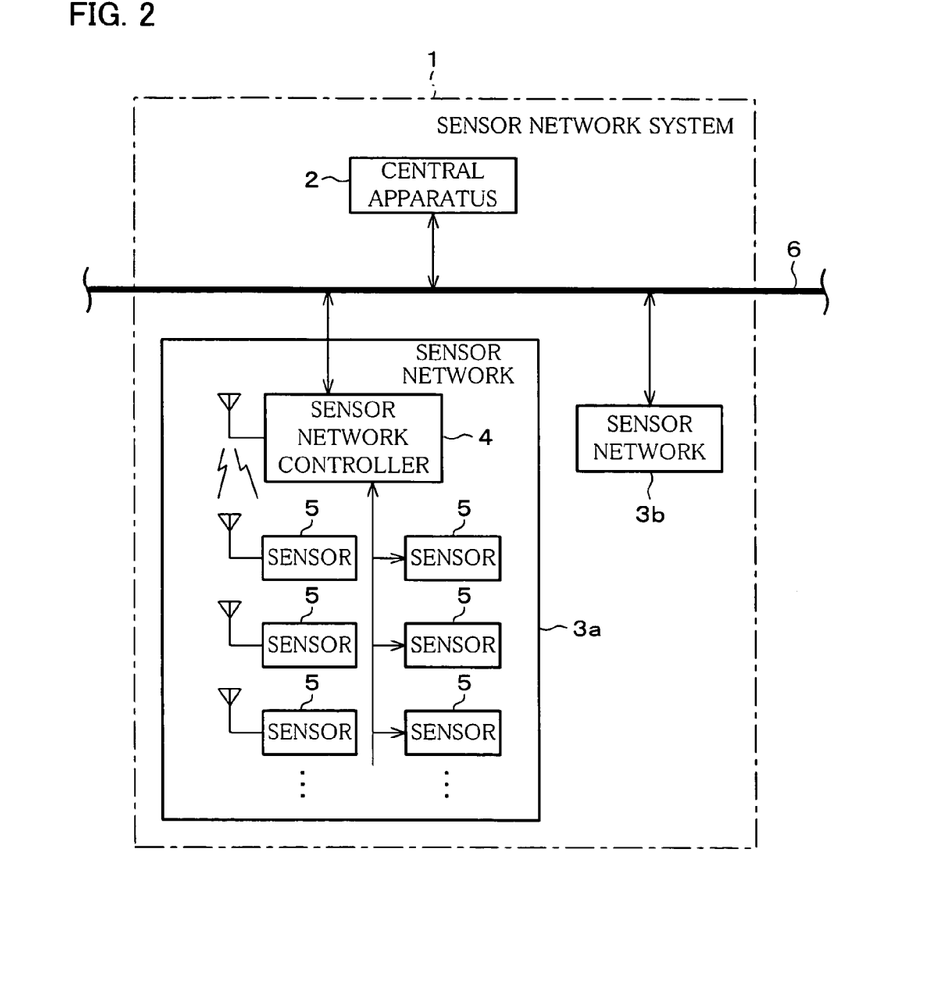
FIG. 2 is a block diagram illustrating the structure of a sensor network system in accordance with an embodiment of the present invention.

FIG. 2 is a block diagram illustrating the structure of the sensor network system in accordance with the present embodiment. A sensor network system 1 is shown which includes a central apparatus 2 and sensor networks 3a, 3b, all connected to a communications network 6. In this example, it is the central apparatus 2 that manages the sensor networks 3a, 3b. Hereinafter, the sensor networks 3a, 3b will be collectively referred to as the "sensor networks 3" when the two networks does not need to be distinguished from each other.

Each sensor network 3 includes a sensor network controller (sensor network gateway) 4 and a set of sensors 5 capable of data communications with the sensor network controller 4.

The types of sensors 5 are selected for specific purposes: for example, detection of car thefts, house break-ins, or fires. The sensors 5 are installed at places suitable for those purposes. Generally, the sensors 5 form sensor networks 3 for individual purposes. The sensor network 3 is, for example, an independent vehicle's on-board LAN or an independent factory PLC network. The central apparatus 2 acquires information from the sensor networks 3 and performs a process in accordance with the purpose of each sensor network 3, to provide services, e.g., a user alerting service in an occurrence of an abnormality.

The sensor network controller 4 and sensors 5 are equipped with respective communications devices. The communications device in the sensor network controller 4 is the host, whereas the communications devices in the sensors 5 are the terminals. The host and terminals communicates data with each other based on a predetermined protocol.

The data communications between the host and terminals may be wired or wireless. Some examples for the latter utilize a short-distance wireless system based on weak radio waves as in wireless LAN (Local Area Network) standards and Bluetooth (registered trademark) standards or a specified small power wireless system. Others utilize an optical wireless system or short-distance infrared communications system. Wired communications may be based on a LAN or utilize dedicated lines.

The communications between the host and terminals may be bidirectional or single-directional, depending on the type of the sensors 5. The communications are bidirectional if the sensors 5 are controlled by the sensor network controller 4 through control signals. Meanwhile, the communications are terminal-to-host single-directional if the sensors 5 send signals to the sensor network controller 4, with no signals traveling in the opposite direction.

In the sensor 5, the interface between the sensor section for sensing and the communications devices (terminals) can be, for example, RS-232C, RS-485, or DeviceNET. It is through this interface that the sensors 5 send sensing data indicating a result of sensing by the sensor sections to the sensor network controller 4. The sensor network controller 4 receives sensing data from the sensors 5, subject the sensing data to a process (detailed later), and feeds the central apparatus 2 with information based the processed data.

The data communications between the sensors 5 and the sensor network controller 4 may be nonprocedural. When this is the case, the sensors 5 may send the sensing data to the sensor network controller 4 by means of analog current or voltage. The sensor network controller 4 performs sampling, A/D conversion, and other required processes on the sensing data.

The description below assumes that the sensors 5 and the sensor network controller 4 communicate digital data unless otherwise specified.

The sensor network controller 4 typically manages multiple (a maximum of 256) sensors 5 constituting the sensor network 3 (e.g., about ten sensors 5 in a sensor network 3 for security management). Sensor networks 3 may overlap as shown in FIG. 3.

Figure 3:
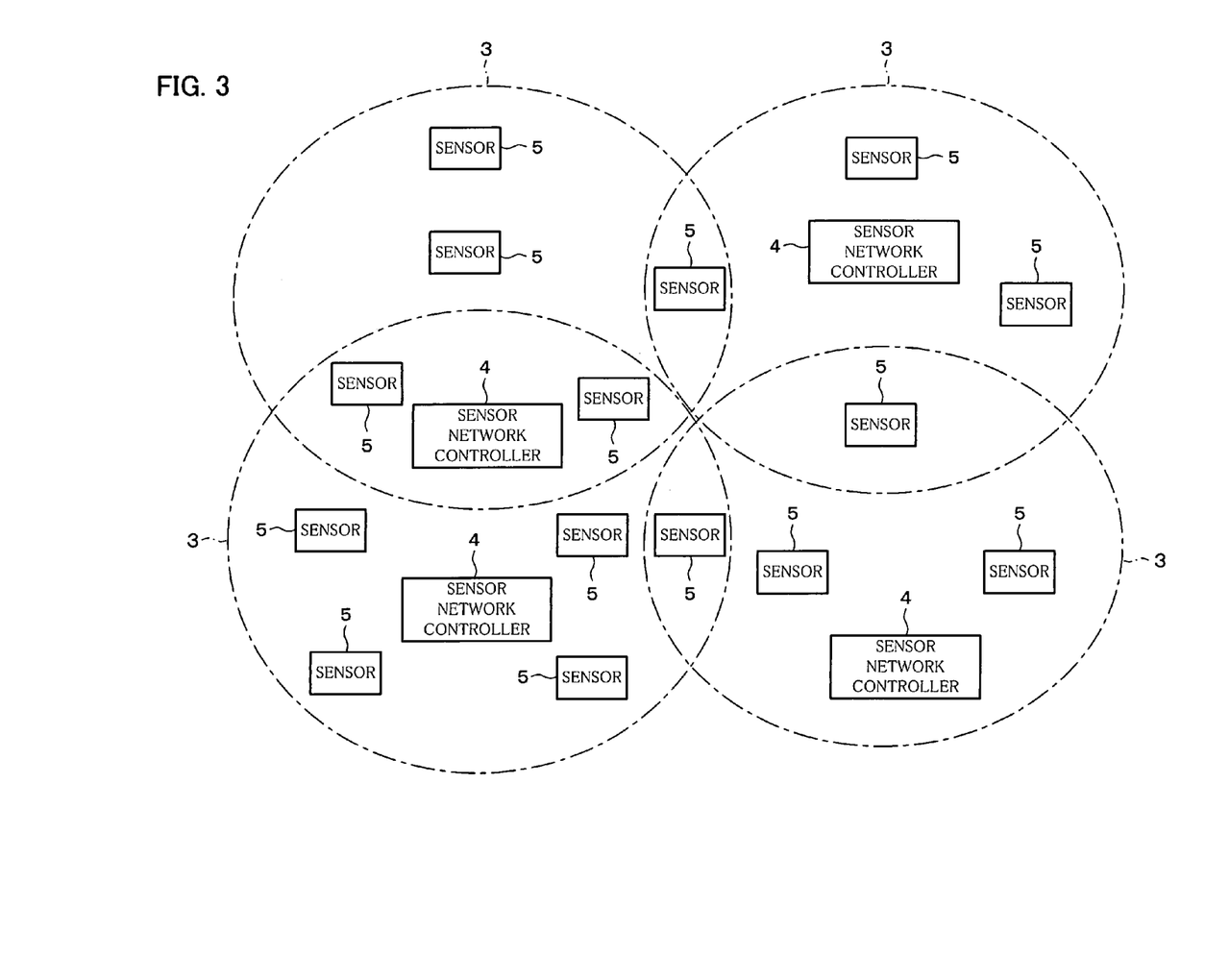
FIG. 3 is a conceptual illustration showing an example of overlapping sensor networks.
Figure 4:
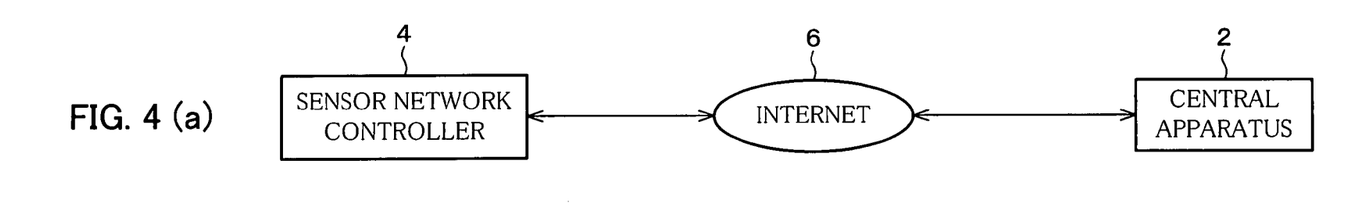
FIG. 4(a) is a conceptual illustration using the Internet as a communications network.
FIG. 4(b) is a conceptual illustration using the Internet and a LAN connected to the Internet as a communications network.
FIG. 4(c) is a conceptual illustration using a public network as a communications network.

FIG. 3 is a conceptual illustration showing an example of overlapping sensor networks 3. In the example of FIG. 3, some sensors 5 belong to two or more sensor networks 3, and two sensor network controllers 4 belong to one sensor network 3. If a sensor 5 is managed by two or more sensor network controllers 4, the sensor 5 in question can keep operating normally following a breakdown or other failure of one of the sensor network controllers 4, thanks to the other sensor network controller(s) 4. Therefore, it is desirable if those sensors 5 with which a high level of reliability is required are managed by two or more sensor network controllers 4.

To identify individual sensors 5 in the sensor network 3, each sensor 5 may be, for example, assigned a unique sensor ID. In some cases, there are a large number of sensors 5 on a sensor network 3. To enable such a configuration, the sensor ID may be expressed using high bits (for example, 64 bits or greater). The sensor ID may be, for example, the IP address under TCP/IP (Transmission Control Protocol/Internet Protocol). To express the sensor ID using a high bit, the 128-bit IPv 6 can be used. In the sensor network 3, however, it is sufficient if the sensor network controller 4 can identify the individual sensors 5; the identification may be implemented in a different way.

The subsequent part of the description will describe a data communications scheme between the sensor network controller 4 and the central apparatus 2.

FIGS. 4(a) to 4(c) are conceptual illustrations showing examples of data communications schemes in the sensor network system 1 between the central apparatus 2 and the sensor network controller 4.

FIG. 4(a) shows a case where the Internet is used as the communications network 6. The Internet may be relied on entirely for the link between the central apparatus 2 and the sensor network controller 4. Alternatively, the sensor network controller 4 may be connected to the Internet by, for example, wireless packet communications used in a packet-based mobile data communications service. A further alternative is to connect the central apparatus 2 to the Internet by a telephone or other public network. The "telephone network" here includes ISDN (Integrated Services Digital Network), PHS (registered trademark) (Personal Handyphone System) networks, and mobile phone networks.

FIG. 4(b) shows a case where the Internet and a LAN (Local Area Network) connected to the Internet are used as the communications network 6. In FIG. 4(b), a LAN intervenes between the Internet and the sensor network controller 4. The LAN may be, for example, an Ethernet (registered trademark) or wireless LAN. A LAN may intervene between the Internet and the central apparatus 2.

FIG. 4(c) shows a case where a public network is used as the communications network 6. The public network may be a telephone network (ISDN, PHS (registered trademark) network, mobile phone network, etc.).

The following description assumes that the Internet is used as the communications network 6 unless otherwise stated, that is, the configuration in FIG. 4(a).

Now, each constituent of the FIG. 2 system will be described in more detail.

(Sensor)

Various sensors are used as the sensors 5 on the sensor network 3. Examples follow.

Those detecting a human include photoelectric sensors, beam sensors, ultrasound sensors, and infrared sensors. Those detecting a movement or destruction of an object include vibration sensors and acceleration sensors (3D sensors, ball semiconductor sensors). Those detecting a sound include microphones, pitch sensors, and acoustic sensors. Those detecting video include video cameras. Those detecting fires include temperature sensors, smoke sensors, and humidity sensors. Those primarily mounted to vehicles include GPS (Global Positioning System) devices, acceleration sensors, wiper ON/OFF sensors, vibration sensors, and tilt sensors. Those installed indoors include light ON/OFF sensors and water leak sensors. Those installed outdoors include rain gauges, wind gauges, and thermometers. There are various other sensors: namely, capacitance level sensors, capacitive intrusion sensors, electric current sensors, voltage sensors, door opening/closure detecting reed switches, and time detecting clocks.

As discussed in the foregoing, the sensors 5 on the sensor network 3 are not limited to devices generally called "sensors." The sensors 5 may be any kind of device which detects an event and for example, converts a sensing result into an electric signal as sensing data for transfer to the sensor network controller 4.

The sensors 5 on the sensor network 3 may be active sensors. The active sensor refers to a device which, like a video camera, has zooming and autofocusing functions and a direction-changing function to change the shooting direction, as well as CCDs (Charge Coupled Devices) as a sensor section for performing sensing, and which automatically operates or is manipulated by the sensor network controller 4 through its control signal. Such active sensors are capable of relatively high precision sensing suitable to the events. For example, an "active" video camera, upon detection of a moving object (smoke, for example) in its shooting range, points itself at the object to shoot it more appropriately.

The sensors 5 on the sensor network 3 may be autonomous. The autonomous sensor here refers to a sensor which notifies the sensor network controller 4 and the central apparatus 2 of information on the sensor itself (sensor information), for example, periodically. The sensor information indicates, for example, the type(s) (including their detection target) and layout (positions) of the sensors.

In some cases, the sensors are attached to movable objects like furniture. When this actually happens, moving the furniture changes the sensor layout, and hence detection targets. For example, suppose that temperature sensors are installed at various places in a room to sense the room temperature distribution, with one of the sensors attached to a piece of furniture. If that piece of furniture is moved, the temperature sensor will sense temperature at a different part of the room. Using an autonomous temperature sensor in such situations makes it possible to continuously keep track of where in the room the sensor is sensing temperature.

The sensors 5 can be divided into three major types as to methods of reporting a sensing result, that is, how they transfer sensing data to the sensor network controller 4: cyclic, event-responsive, and request-responsive (polling).

A cyclic sensor automatically senses at a predetermined time cycle to convey sensing data. An example is a temperature sensor which sends temperature data once every 10 minutes. An event-responsive sensor automatically conveys sensing data when it has detected a predetermined event, for example, when it has detected a physical quantity greater than or equal to a threshold value. An example is a temperature sensor sends temperature data when temperature has reached or exceeded 50 degrees Celsius. A request-responsive sensor senses and conveys sensing data in response to a request for sensing data from the sensor network controller 4.

(Central Apparatus)

Figure 5:
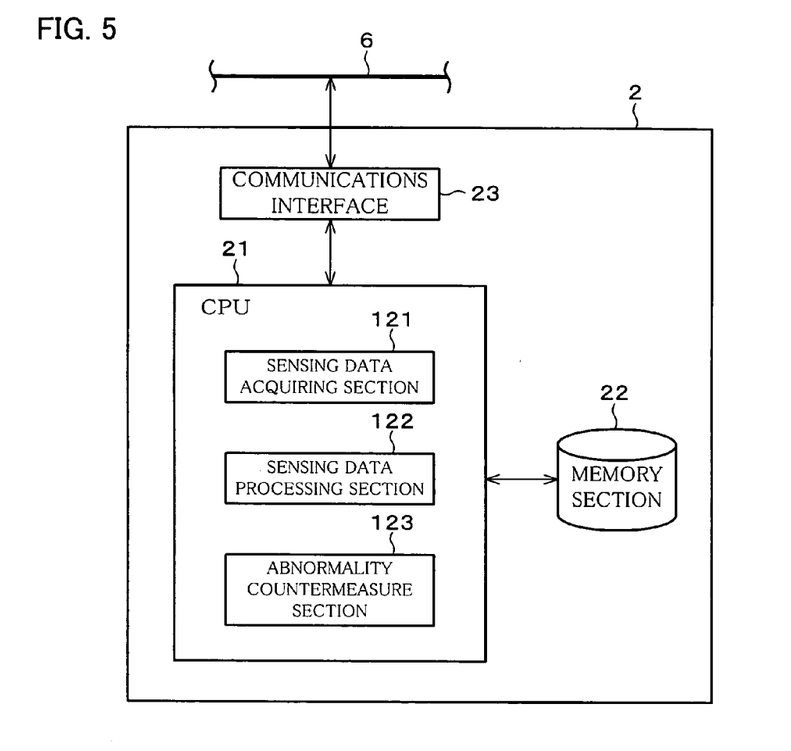
FIG. 5 is a block diagram illustrating the internal structure of the central apparatus for a sensor network system in FIG. 2.

FIG. 5 is a block diagram illustrating the internal structure of the central apparatus 2. The central apparatus 2 detects car thefts, house break-ins, fires, etc. as mentioned earlier, by managing the sensor network 3. To this end, the central apparatus 2 acquires sensing data provided by the sensors 5 through the sensor network controller 4, and based on that information determines, for example, if an abnormality has occurred. If it is determined that an abnormality has occurred, the central apparatus 2, for example, sends a notification to the user's mobile phone, a police station, or a fire station.

The following description will assume that the central apparatus 2 performs a car theft, house break-in, fire, and other abnormality monitoring process ("monitoring process") by means of the sensor network 3. The embodiment is however not limited to this process, and is applicable to any other kind of process that is based on the sensing data given by the sensors 5.

The central apparatus 2 is, for example, a computer (e.g., personal computer or large computer) with communication function and includes: a CPU 21 implementing various processes; a memory section 22 in which various data is stored; and a communications interface 23 providing an interface to the communications network 6. Although not shown, the central apparatus 2 further includes an input section (e.g., keyboard and mouse) and a display section (e.g., display device) to allow inputs and updates for the various information in the memory section 22.

The CPU 21, based on its computing functions, executes various data processing and produces instructions to various control circuits. The CPU 21 controls the entire central apparatus 2, the sensor network controller 4, and the sensors 5.

To execute the monitoring process, the CPU 21 functions as function blocks, that is, a sensing data acquiring section 121, a sensing data processing section 122, and an abnormality countermeasure section 123. These function blocks are materialized by the CPU 21 executing predetermined computer programs in the memory section 22.

The sensing data acquiring section 121 requests sensing data provided by the sensors 5 through the sensor network controller 4 by sending a sensing data request signal through the communications interface 23, so as to acquire the sensing data as transmitted from the sensors 5 in accordance with the request through the communications interface 23.

Figure 6:
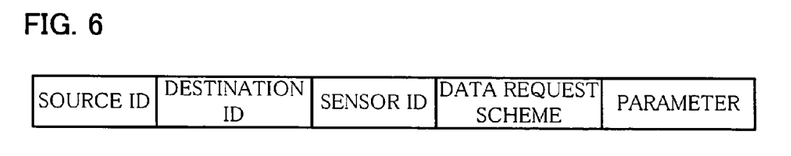
FIG. 6 is a conceptual illustration showing an example of a format of a sensing data request signal.

The sensing data request signal, as shown in FIG. 6, conveys a source ID, destination ID, sensor ID, data request scheme, and parameter. FIG. 6 is a conceptual illustration showing an example of a format of a sensing data request signal.

The source ID is the ID of the central apparatus 2 which is the source of the sensing data request signal. The destination ID is the ID of the sensor network controller 4 which is the destination of the sensing data request signal. The sensor ID is the ID of a sensor 5 to which a request is sent for sensing data. In other words, the sensor ID designates the sensor 5 to which a request is sent for sensing data. These IDs are, for example, IP addresses under TCP/IP.

The data request scheme designates a scheme by sensing data is requested. The sensing data request scheme is either cyclic, event-responsive, request-responsive. Here, the cyclic request signal is a request signal for a periodic transmission of sensing data from the sensor network controller 4. The event-responsive request signal is a request signal for a transmission of sensing data when there has occurred a predetermined change in sensing results of a sensor 5 in question. The request-responsive request signal is a direct request signal for a sensing data, that is, a request signal for a transmission of sensing data as a response to the sensing data request signal.

The cyclic request signal is a request signal for a transmission of sensing data at a designated cycle. The request-responsive request signal is a request signal for sensing data as of that time. For these reasons, the two signals request sensing data at a designated timing.

The parameter indicates a set of information required in accordance with data request scheme. Examples follow: For a cyclic request signal, the parameter may be information designating a transmission starting time and cycle for the sensing data. For an event-responsive request signal, the parameter may be information designating changes, in sensing results, which evoke a transmission of sensing data, that is, information on a criterion for designating changes.

The sensing data processing section 122, for example, determines whether an abnormal has occurred on the basis of the sensing data acquired by the sensing data acquiring section 121. The sensing data processing section 122 in some cases acquires sensing data from other sensors 5 to determine an occurrence of an abnormality on the basis of sensing data from a set of sensors 5. When this is the case, the sensing data processing section 122 instructs the sensing data acquiring section 121 to acquire sensing data from the other sensors 5.

The abnormality countermeasure section 123, when the sensing data processing section 122 has determined that an abnormality has occurred, implements a predetermined process to deal with the abnormality. The process implemented by the abnormality countermeasure section 123 is, for example, to send a notification on the occurrence of the abnormality to the user's mobile phone, a police station, or a fire station.

The memory section 22 stores computer programs executed by the CPU 21 to materialize the sensing data acquiring section 121, sensing data processing section 122, and abnormality countermeasure section 123 as mentioned earlier, as well as various data required to execute the computer programs.

The communications interface 23 operates as an interface to the communications network 6. The central apparatus 2 can communicate data with the sensor network controller 4 via the communications interface 23. Sensing data request signals and sensing data are exchanged between the central apparatus 2 and the sensor network controller 4 via the communications interface 23.

The central apparatus 2, as mentioned earlier, has a role to request sensing data from the sensor network controller 4; the central apparatus 2 can be termed a "client" to the sensor network controller 4.

(Sensor Network Controller)

Figure 1:
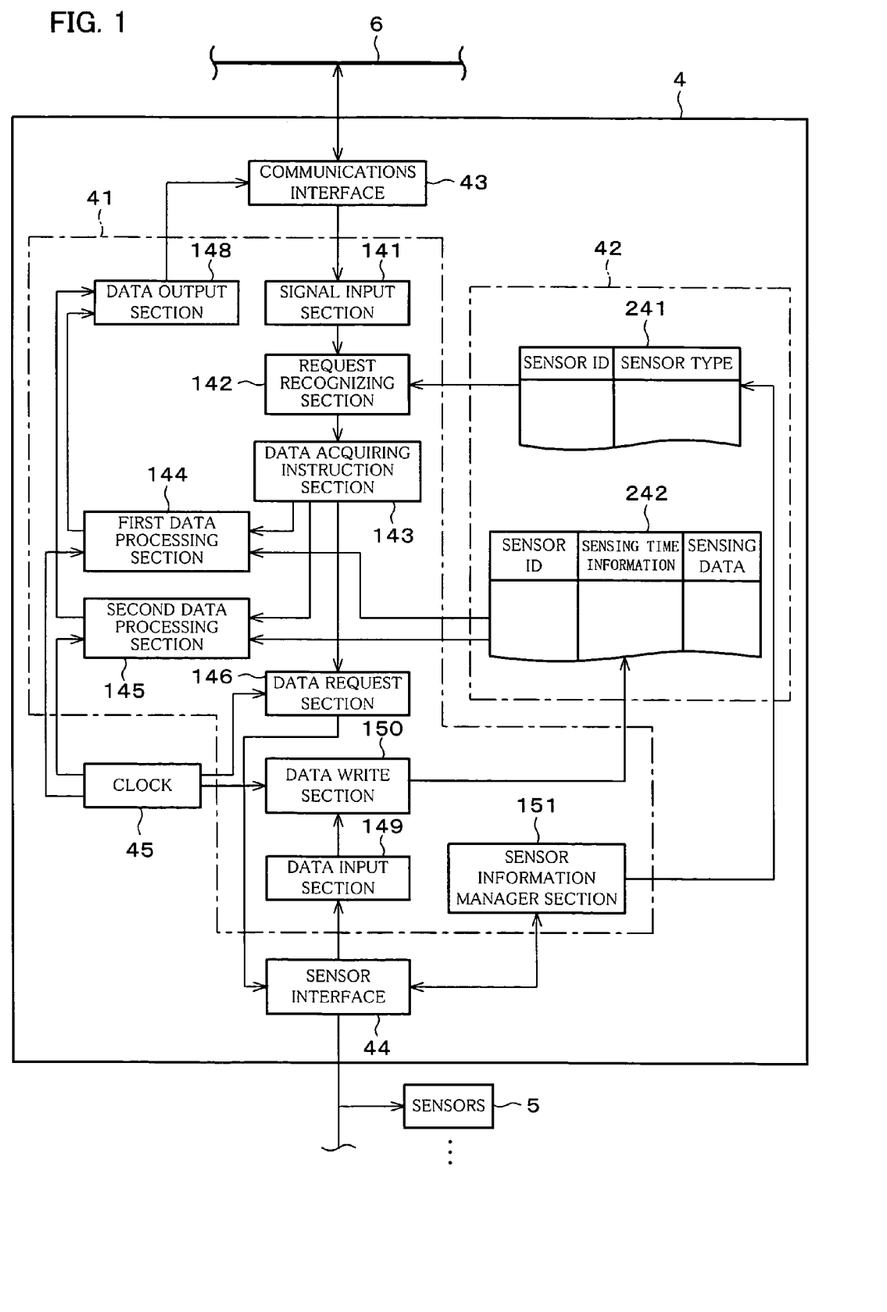
FIG. 1 is a block diagram illustrating the internal structure of a sensor network controller for a sensor network system in accordance with an embodiment of the present invention.

FIG. 1 is a block diagram illustrating the internal structure of the sensor network controller 4. The sensor network controller 4 collects sensing data from the sensors 5 by controlling the sensor network 3 and provides the sensing data to the central apparatus 2 in response to a request.

The sensor network controller 4 includes: a CPU 41 executing various processes; a memory section 42 holding various data; a communications interface 43 providing an interface to the communications network 6; a sensor interface 44 providing an interface to the sensors 5; and a clock 45 generating time information.

The communications interface 43 operates as an interface to the communications network 6. The sensor network controller 4 can communicate data with the central apparatus 2 via the communications interface 43. Sensing data request signals and sensing data are exchanged between the central apparatus 2 and the sensor network controller 4 via the communications interface 43.

The sensor interface 44 operates as an interface to the sensors 5. The sensor network controller 4 can communicate data with the sensors 5 via the sensor interface 44. The sensor network controller 4 can acquire sensing data from the sensors 5 via the communications interface 43. If the sensors 5 are controlled through, for example, a control signal, the control signal is sent to the sensors 5 via the communications interface 43. The aforementioned communications device is omitted in FIG. 1.

The clock 45 generates time information containing the current time to feed the CPU 41. The time information provided by the clock 45 may contain the date.

The CPU 41, based on its computing functions, executes various data processing and produces instructions to various control circuits. The CPU 41 controls the entire sensor network controller 4 and the sensors 5.

The CPU 41 functions as function blocks, that is, a signal input section 141, a request recognizing section 142, a data acquiring instruction section 143, a first data processing section 144, a second data processing section 145, a data request section 146, a data output section 148, a data input section 149, a data write section 150, and a sensor information manager section 151, in order to collect sensing data from the sensors 5 and provide the sensing data to the central apparatus 2 in response to a request. These function blocks are materialized by the CPU 41 executing predetermined computer programs in the memory section 42. The following will describe the function blocks.

The signal input section 141 feeds to the CPU 41 a sensing data request signal transmitted from the central apparatus 2 with the sensor network controller 4 as the destination and received by the communications interface 43.

The request recognizing section 142 recognizes the scheme used for the sensing data request signal, i.e., cyclic, event-responsive, or request-responsive, on the basis of the data request scheme of the incoming sensing data request signal (see FIG. 6). Also, the request recognizing section 142 recognizes the type of sensors 5 from which sensing data is requested, i.e., cyclic, event-responsive, or request-responsive, on the basis of the sensor ID (see FIG. 6) in the incoming sensing data request signal. To recognize the type of sensors 5, the request recognizing section 142 makes a reference to a sensor type table 241 stored in the memory section 42. The sensor type table 241 is a table associating the sensor ID and type for each sensor 5 on the sensor network 3.

The data acquiring instruction section 143 decides a sensing data acquiring process (will be detailed later) on the basis of the recognition by the request recognizing section 142, and sends an instruction based on the decision and a required portion of the information contained in the sensing data request signal to the first data processing section 144, the second data processing section 145, and the data request section 146. Processes carried out by the data acquiring instruction section 143, the first data processing section 144, the second data processing section 145, and the data request section 146 will be detailed later.

The data output section 148 outputs the sensing data from the first data processing section 144 or the second data processing section 145 to the communications interface 43 in order to transmit the sensing data to the central apparatus 2 which is the source of the sensing data request signal.

The data input section 149 feeds to the CPU 41 a sensing data transmitted from the sensors 5 to the sensor interface 44.

The data write section 150 writes the incoming sensing data to a sensing data table 242 in the memory section 42. The sensing data table 242 is a table associating sensing time information to the sensor ID of the sensor 5 which is the source of a set of sensing data fed by the data input section 149. The sensing time information is acquired based on the clock 45 when the data write section 150 writes the sensing data to the sensing data table 242. If the sensing time information is contained in the sensing data transmitted from the sensors 5, the data write section 150 extracts the sensing time information from the sensing data to write the sensing time information as sensing time information in the sensing data table 242.

The sensor information manager section 151 recognizes the sensor ID, type, etc. of a new sensor 5 and registers them to the sensor type table 241 when the sensor 5 is added to the sensor network 3. For the sensor information manager section 151 to recognize a sensor ID, for example, it would suffice if the sensor information manager section 151 assigns sensor IDs within the sensor network 3. For the sensor information manager section 151 to recognize a sensor type, for example, it would suffice if the added sensor 5, when communicating with the sensor network controller 4 for the first time, transmits information according to which the sensor type is identifiable so that the sensor information manager section 151 can recognize the sensor type on the basis of the information. For the sensor information manager section 151 to recognize the sensor type, alternatively, the shape of, for example, a plug through which the sensor interface 44 is connected may be specified in advance for each sensor type so that the sensor information manager section 151 can identify the plug shape. The sensor information manager section 151 allows "plug-and-play" addition of sensor 5 to the sensor network 3.

Now, the processes will be described that are carried out by the data acquiring instruction section 143, the first data processing section 144, the second data processing section 145, and the data request section 146.

Figure 7:
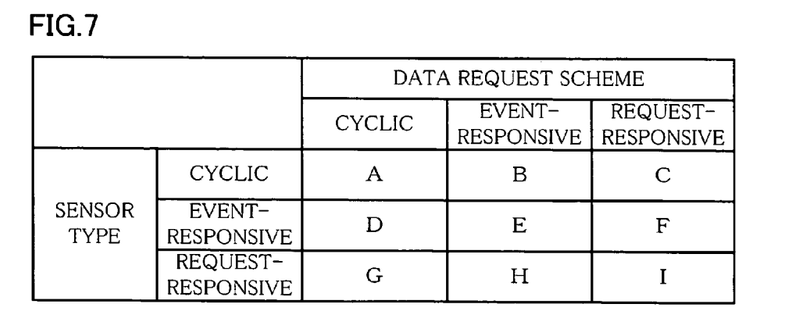
FIG. 7 is a table showing combinations of data request schemes and sensor types for the sensing data request signal.

FIG. 7 shows possible combinations of data request schemes for the sensing data request signal and sensor types, that is, patterns of recognition by the request recognizing section 142. FIG. 7 is a table showing combinations of data request schemes for the sensing data request signal and sensor types. As shown in FIG. 7, pattern A refers to instances where the data request scheme is cyclic, and the sensor type is cyclic, pattern B to instances where the data request scheme is event-responsive, and the sensor type is cyclic, and patterns C to I to instances shown in FIG. 7.

In patterns A, C, D, F, the first data processing section 144 performs a sensing data acquiring process. In patterns B, E, the second data processing section 145 performs a sensing data acquiring process. In patterns G, I, it is the first data processing section 144 and the data request section 146 which perform a sensing data acquiring process. In pattern H, it is the second data processing section 145 and the data request section 146 which perform a sensing data acquiring process.

Under these conditions, the first data processing section 144 acquires sensing data and sensing time information from the sensing data table 242 in response to an instruction from the data acquiring instruction section 143 and where necessary, performs computing based on the sensing data and sensing time information, in order to generate sensing data which is to be fed to the central apparatus 2 for transmission to the data output section 148.

The data generated by computing differs from the raw data representing the sensing results of the sensors 5. Both sets of data will be called sensing data here.

The second data processing section 145 acquires sensing data and sensing time information from the sensing data table 242 in response to an instruction from the data acquiring instruction section 143 to determine whether a predetermined change has occurred in the sensing results. Also, if there has occurred a predetermined change in the sensing results, the section 145 sends sensing data after the change to the data output section 148.

The data request section 146 requests sensing data from request-responsive sensors 5 in response to an instruction from the data acquiring instruction section 143. For this purpose, the data request section 146 sends a sensing signal by means of which sensing data is requested to the request-responsive sensors 5 via the sensor interface 44.

The following will describe the patterns introduced above. The sensor 5 corresponding to the sensor ID carried by a sensing data request signal will be termed the sensor in question. Also, in the following, the first data processing section 144 or the second data processing section 145 retrieve sensing data on the sensor in question from the sensing data table 242, unless otherwise mentioned.

In pattern A, the data request scheme is cyclic, and the sensor type is also cyclic. In such instances, the data acquiring instruction section 143 sends a sensing data request signal containing a sensor ID and parameter to the first data processing section 144. The section 143 also instructs the first data processing section 144 to periodically retrieve sensing data on the basis of the sensor ID and parameter and generate sensing data matched with the sensing data request signal for transmission to the data output section 148.

In this situation, the first data processing section 144, in reference to the time information from the clock 45, retrieves a predetermined number of sets of sensing data and sensing time information corresponding to the sensing data, starting from the latest set and sequentially backwards, out of the sensing data table 242 at predetermined timings. The timings at which sensing data is retrieved are based on the parameter contained in the sensing data request signal. The parameter determines a transmission starting time (t0) for the sensing data as a reference and also determines a cycle (C). The timings are given by: t0+nC (n=0, 1, 2 . . . ). This time will be hereinafter referred to as a first designated time.

The first data processing section 144 generates sensing data at the first designated time on the basis of the retrieved sensing data and sensing time information. In pattern A, both the data request scheme and the sensor type are cyclic. Their cycles however may not always match. When the cycles do not match, the sensing data at the first designated time is not stored in the sensing data table 242. When this is the case, the first data processing section 144 computes the sensing data at the first designated time on the basis of a sets of sensing data and sensing time information retrieved from the sensing data table 242. The computing may be done by way of interpolation or another well-known technique. New sensing data may not be computed; instead, sensing data may be selected which was derived from the detection at a nearest time to the first designated time. The first data processing section 144 sends the generated sensing data to the data output section 148.

Thus, the sensing data can be given to the central apparatus 2 at sensing timings designated by the sensing data request signal even when the sensing timings designated by a cyclic sensing data request signal do not match the sensing timings of the cyclic sensor in question.

In pattern C, the data request scheme is request-responsive, whereas the sensor type is cyclic. The data acquiring instruction section 143 sends the sensor ID in the sensing data request signal to the first data processing section 144, and instructs the first data processing section 144 to retrieve sensing data based on the ID and generate sensing data at a time based on the sensing data request signal for transmission to the data output section 148. The time based on the sensing data request signal is, for example, a time when an enquiry is made. The time when the sensing data request signal is transmitted from the central apparatus 2 and the time when the sensing data request signal is received by the sensor network controller 4 can be regarded as the time when an enquiry is made. Alternatively, a time based on the sensing data request signal may be designated as the time when the processes are being performed, i.e., the current time. Hereinafter, this time will be referred to as the second designated time.

Under these circumstances, the first data processing section 144 retrieves a predetermined number of sets of sensing data and sensing time information corresponding to the sensing data, starting from the latest set and sequentially backwards, out of the sensing data table 242.

The first data processing section 144 generates sensing data at the second designated time on the basis of the retrieved sensing data and sensing time information. In pattern C, again, the sensing data at the second designated time may not be stored in the sensing data table 242. Accordingly, similarly to pattern A, the first data processing section 144 computes the sensing data at the second designated time on the basis of the multiple sets of sensing data and sensing time information retrieved from the sensing data table 242. Again, In this instance, new sensing data may not be computed; instead, sensing data may be selected which was derived from the detection of a nearest time to the second designated time. The first data processing section 144 sends the generated sensing data to the data output section 148.

Thus, the sensing data can be given to the central apparatus 2 at sensing timings designated by the sensing data request signal even when the sensing timings designated by a request-responsive sensing data request signal do not match the sensing timings of the cyclic sensor in question. That is, sensing data can be provided which matches a request-responsive sensing data request signal on the basis of the sensing data given by the cyclic sensor in question.

In pattern D, the data request scheme is cyclic, whereas the sensor type is event-responsive. The data acquiring instruction section 143 sends the sensor ID and parameter in the sensing data request signal to the first data processing section 144, and instructs the first data processing section 144 to periodically retrieve and send the latest sensing data on the basis of the sensor ID and parameter for transmission to the data output section 148.

In this situation, the first data processing section 144, in reference to the time information from the clock 45, retrieves the latest sensing data from the sensing data table 242 at similar timings to pattern A, and sends the retrieved sensing data to the data output section 148.

In this instance, since the sensor in question is an event-responsive sensor, the sensing data sent to the data output section 148 as in the above description appropriately represents the state of the sensing target at the first designated time. Hence, sensing data can be provided which matches the cyclic sensing data request signal on the basis of the sensing data from the event-responsive sensor in question.

In pattern F, the data request scheme is request-responsive, whereas the sensor type is event-responsive. The data acquiring instruction section 143 sends the sensor ID in the sensing data request signal to the first data processing section 144, and instructs the first data processing section 144 retrieves sensing data on the basis of the ID and similarly to pattern C, retrieves the latest sensing data at a time based on the sensing data request signal (the second designated time) for transmission to the data output section 148.

Under these circumstances, the first data processing section 144 retrieve the latest sensing data from the sensing data table 242 at the second designated time and sends the retrieved sensing data to the data output section 148.

In this instance, since the sensor in question is an event-responsive sensor, the sensing data sent to the data output section 148 as in the above description appropriately represents the state of the sensing target at the second designated time. Hence, sensing data can be provided which matches the request-responsive sensing data request signal on the basis of the sensing data from the event-responsive sensor in question.

In pattern B, the data request scheme is event-responsive, whereas the sensor type is cyclic. The data acquiring instruction section 143 sends the sensor ID and parameter in the sensing data request signal to the second data processing section 145, and instructs the second data processing section 145 to periodically retrieve sensing data on the basis of the sensor ID and parameter, determine whether there has occurred a change in the sensing results on the basis of the sensing data and the criterion for changes as determined by the parameter, and if there has occurred a change, send sensing data after the change to the data output section 148.

In this situation, the second data processing section 145, in reference to the time information from the clock 45, retrieves the latest sensing data from the sensing data table 242 at a predetermined cycle. The second data processing section 145 contains the sensing data retrieved last time.

The second data processing section 145 then determines whether there has occurred a change in the sensing results on the basis of the retrieved sensing data and the sensing data retrieved last time, and if there has occurred a change in the sensing results, sends sensing data after the change to the data output section 148.

Hence, if a change designated by the parameter in the sensing data request signal has occurred in the sensing results given by the cyclic sensor in question, the sensing data after the change can be provided to the central apparatus 2. Therefore, sensing data can be provided which matches the event-responsive sensing data request signal on the basis of the sensing data given by the cyclic sensor in question.

In pattern E, the data request scheme is event-responsive, and the sensor type is also event-responsive. The data acquiring instruction section 143 sends the sensor ID in the sensing data request signal to the second data processing section 145, and instructs the second data processing section 145 to periodically retrieve sensing data on the basis of the sensor ID, determine whether there has occurred a change in the sensing results on the basis of the sensing data, and if there has occurred a change, transmit sensing data after the change to the data output section 148.

In this situation, the second data processing section 145, in reference to the time information from the clock 45, retrieves the latest sensing data on the sensor in question from the sensing data table 242 at a predetermined cycle. The second data processing section 145 contains the sensing data retrieved last time.

The second data processing section 145 determines whether there has occurred a change in the sensing results on the basis of the retrieved sensing data and the sensing data retrieved last time, and if there has occurred a change in the sensing results, sends the sensing data after the change to the data output section 148.

Thus, the sensing data after the change can be provide to the central apparatus 2 even if there has occurred a change in the sensing results given by the event-responsive sensor in question.

In pattern H, the data request scheme is event-responsive, whereas the sensor type is request-responsive. The data acquiring instruction section 143 sends the sensor ID and parameter in the sensing data request signal to the second data processing section 145, and instructs the second data processing section 145 to periodically retrieve sensing data on the basis of the sensor ID and parameter, determine whether there has occurred a change in the sensing results on the basis of the sensing data and the criterion for changes as determined by the parameter, and if there has occurred a change, send sensing data after the change to the data output section 148. Also, the data acquiring instruction section 143 instructs the data request section 146 to periodically request sensing data from the sensor in question.

In this situation, the data request section 146, in reference to the time information from the clock 45, requests sensing data from the sensor in question at a predetermined timing so that new sensing data is written to the sensing data table 242 before the second data processing section 145 retrieves sensing data.

Also, the second data processing section 145, in reference to the time information from the clock 45, retrieves the latest sensing data on the sensor in question from the sensing data table 242 at a predetermined cycle. The second data processing section 145 contains the sensing data retrieved last time.

The second data processing section 145 determines whether there has occurred a change in the sensing results on the basis of the retrieved sensing data and the sensing data retrieved last time, and if there has occurred a change in the sensing results, sends sensing data after the change to the data output section 148.

Hence, if a change designated by the parameter in the event-responsive request signal has occurred in the sensing results given by the request-responsive sensor, the sensing data after the change can be provided to the central apparatus 2. Therefore, sensing data can be provided which matches the event-responsive sensing data request signal on the basis of the sensing data given by the request-responsive sensor in question.

In pattern G, the data request scheme is cyclic, whereas the sensor type is request-responsive. The data acquiring instruction section 143 sends the sensor ID and parameter in the sensing data request signal to the first data processing section 144, and instructs the first data processing section 144 to periodically retrieve sensing data on the basis of the sensor ID and parameter for transmission to the data output section 148. Also, the data acquiring instruction section 143 instructs the data request section 146 to periodically request sensing data from the sensor in question.

In this situation, the data request section 146, in reference to the time information from the clock 45, requests sensing data from the sensor in question at a predetermined timing so that new sensing data is written to the sensing data table 242 immediately before the second data processing section 145 retrieves the sensing data.

Also, the first data processing section 144, in reference to the time information from the clock 45, periodically retrieves the latest sensing data from the sensing data table 242 at the first designated times for transmission to the data output section 148.

Thus, sensing data can be provided which matches the cyclic sensing data request signal on the basis of the sensing data given by the request-responsive sensor in question.

In pattern I, the data request scheme is request-responsive, and the sensor type is also request-responsive. The data acquiring instruction section 143 sends the sensor ID in the sensing data request signal to the first data processing section 144, and instructs the first data processing section 144 to retrieve sensing data on the basis of the sensor ID for transmission to the data output section 148. Also, the data acquiring instruction section 143 instructs the data request section 146 to request sensing data from the sensor in question.

In this situation, the data request section 146 requests sensing data from the sensor in question at a predetermined timing so that new sensing data is written to the sensing data table 242 immediately before the second data processing section 145 retrieves the sensing data.

In addition, the first data processing section 144 retrieves the latest sensing data on the sensor in question from the sensing data table 242 for transmission to the data output section 148.

Hence, sensing data can be provided which matches the request-responsive sensing data request signal on the basis of the sensing data given by the request-responsive sensor in question.

Another possible sensor type is nonprocedural. A nonprocedural sensor continuously outputs current or voltage carrying sensing data in analog to the sensor network controller 4. To enable the sensor network controller 4 to process such analog data, there are provided a sampling circuit, an A/D converter circuit, etc. which converts the data to cycle sensing data between the sensor interface 44 and the data input section 149. The converted data can be handled similarly to sensing data given by cyclic sensors.

According to the aforementioned arrangement, the sensor network controller 4 can provide sensing data which matches with the data request scheme for the sensing data request signal on the basis of the sensing data from the sensors 5 even when the data request scheme and the sensor type of the sensing data request signal do not match. In other words, when there exists a difference in type of sensors 5 on the sensor network 3, the sensor network controller 4 is capable of "hiding" the difference from the central apparatus 2 and allows the central apparatus 2 to access all the sensors 5 in a similar manner.

Therefore, the use of the sensor network controller 4 makes it possible for the central apparatus 2 to acquire sensing data in response to a request even when the scheme by which the sensors 5 conveys sensing data does not match with the scheme by which the central apparatus 2 requests sensing data, enabling construction of a sensor network system including various types of sensors 5 and a central apparatus 2.

The sensor network controller 4 does not need to be capable of handling all previous patterns A to I. The sensor network controller 4 only needs to be capable of at least one of the patterns. The pattern(s) to be handled by the sensor network controller 4 can be arbitrarily selected from patterns A to I and combined in accordance with the arrangement of the sensor network system 1.

As in the foregoing, the sensor network controller 4 (sensor manager device) receives the sensing data transmitted from the sensors 5 and provides data based on the sensing data to an external central apparatus 2 (client). To this end, the sensor network controller 4 includes: a sensor interface 44 and a data input section 149 (data receiver section) receiving sensing data transmitted from sensors 5; a memory section 42 storing the received sensing data; a first data processing section 144 and a second data processing section 145 (data processing sections) performing a predetermined process on the sensing data stored in the memory section 42; and a data output section 148 outputting, to a central apparatus 2, sensing data transmitted from the first data processing section 144 and the second data processing section 145. The sensor network controller 4 has following features.

The sensor network controller 4 includes a data write section 150 writing the received sensing data and sensing time information indicating a sensing time of the sensing data in association with each other in the memory section 42. The sensor in question automatically performs sensing and transmits sensing data. When the central apparatus 2 designates a timing and requests sensing data acquired by the sensor in question (patterns A, C), the first data processing section 144 generates sensing data which is at a timing designated by the central apparatus 2 on the basis of the sensing data and the sensing time information stored in the memory section 42. Thus, sensing data can be provided appropriately at a timing designated by the central apparatus 2.

When the sensor in question, when there has occurred a change in a sensing result, transmits sensing data after the change, and the central apparatus 2 designates a timing and requests sensing data acquired by the sensor in question (patterns D, F), the sensor network controller 4 is such that the first data processing section 144 acquires the latest sensing data stored in the memory section 42 at timings designated by the central apparatus 2 (the first and second instructed times) and sends it to the data output section 148. Because the sensor in question, when there has occurred a change in a sensing result, transmits sensing data after the change, the sensing data hence acquired appropriately represents the state of the sensing target at a timing designated by the central apparatus 2. Therefore, sensing data is appropriately provided at a timing designated by the central apparatus 2.

Further, when the sensor in question automatically performs sensing and transmits sensing data, and the central apparatus 2 requests sensing data when there has occurred a change in a sensing result acquired by the sensor in question (pattern B), the sensor network controller 4 is such that the second data processing section 145 determines an occurrence of a change in sensing data on the basis of the sensing data stored in the memory section 42, and when it is determined that there has occurred a change, acquires sensing data after the change and transmits it to the data output section 148. As discussed in the foregoing, by the second data processing section 145 checking an occurrence of a change, a change in the sensing results can be acquired even if the sensor in question automatically performs sensing and transmits sensing data. Therefore, sensing data when there has occurred a change in a sensing result acquired by the sensor in question is provided to the central apparatus 2.

The sensor network controller 4 further includes a data request section 146 (signal output section) outputting a sensing signal to the sensor in question. When the sensor in question performs sensing and transmits sensing data in accordance with a sensing signal requesting a transmission of sensing data, and the central apparatus 2 requests sensing data when there has occurred a change in a sensing result acquired by the sensor in question (pattern H), the second data processing section 145 determines an occurrence of a change in a sensing data on the basis of stored in the memory section 42, and when it is determined that there has occurred a change, acquires and sends sensing data after the change to the data output section 148. As discussed in the foregoing, by the data request section 146 requesting sensing data and the second data processing section 145 checking an occurrence of a change, a change in the sensing results can be acquired. Therefore, sensing data when there has occurred a change in a sensing result acquired by the sensor is provided to the central apparatus 2.

It is desirable if there are provided a request recognizing section 142 in a sensor network controller 4 identifying to which of the foregoing instances, in other words, to which one of patterns A, C; patterns D, F; pattern B; or pattern H the sensor type and the request sensing data scheme of the central apparatus 2 correspond. When this is the case, the sensor network controller 4 includes a communications interface 43 (signal receiver section) receiving a sensing data request signal transmitted from the central apparatus 2. The sensing data request signal conveys, among other things, sensor identification information (sensor ID) by which a sensor 5 is identified and a scheme by which sensing data is requested, that is, request scheme identification information (data request scheme, parameter) identifying whether sensing data acquired by the sensor in question is requested by designating a timing or sensing data when there has occurred a change in a sensing result acquired by the sensor in question is requested. The request recognizing section 142, in reference to the sensor type table 241 in the memory section 42, recognizes the sensor type and the request sensing data scheme used by the central apparatus 2 on the basis of the sensing data request signal.

Lastly, the objective of the present invention can achieved also by providing a system or device with a storage medium containing computer-readable program code (execution program, intermediate code program, source program) of a computer program for controlling a sensor manager device, the computer program constituting software realizing the functions of the aforementioned, present sensor network controller 4, and retrieving and executing the program code contained in the storage medium using the computer (or CPU, MPU, DSP) of the devices constituting the present sensor network controller 4. When this is the case, the program code itself retrieved from the storage medium realizes the aforementioned functions. The storage medium containing the program code constitutes the present invention.

The embodiments and examples described in BEST MODE FOR CARRYING OUT THE INVENTION are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

The present invention is applicable to sensor management where sensing data is received from a sensor and data based on sensing data is provided to an external client, especially to various sensor networks where the sensor network controller need to manage many sensors.

The invention claimed is:

1. A sensor manager device receiving sensing data transmitted from one or more sensors and providing data based on the sensing data to an external client,
said sensor manager device comprising:
a data receiver section receiving sensing data transmitted from each of the sensors;
a data write section writing the received sensing data, sensing time information indicating a sensing time of the sensing data, and a unique sensor ID of the sensor transmitting the sensing data, in association with one another to a memory section;
the memory section storing the sensing data, the sensing time information, and the sensor ID;
a signal input section receiving a sensing data request signal transmitted from the client;
a request recognizing section recognizing a scheme of the sensing data request signal and a type of a sensor designated by the client;
a data acquiring instruction section determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;
a data processing section generating based on the data acquiring process instruction from the data acquiring instruction section, in cases where the designated sensor automatically performs sensing and transmits sensing data and that the scheme of the sensing data request signal is a scheme in which the client designates a timing and requests sensing data acquired by the designated sensor, the sensing data which is provided, by the sensor designated by the client, at the timing designated by the client, on the basis of the sensing data, the sensing time information, and the sensor ID stored in the memory section; and
a data output section outputting the sensing data generated by the data processing section to the client.

2. The sensor manager device as set forth in claim 1, wherein
the data processing section interpolates the sensing data which is at the timing designated by the client on the basis of the sensing data and the sensing time information stored in the memory section.

3. The sensor manager device as set forth in claim 1, wherein
said sensor manager device manages multiple sensors and records types into which the sensors are categorized as to sensing data transmission method.

4. A sensor manager device receiving sensing data transmitted from one or more sensors and providing data based on the sensing data to an external client,
said sensor manager device comprising:
a data receiver section receiving sensing data transmitted from each of the sensors;
a memory section storing the received sensing data;
a signal input section receiving a sensing data request signal transmitted from the client;
a request recognizing section recognizing a scheme of the sensing data request signal and a type of a sensor designated by the client;
a data acquiring instruction section determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;
a data processing section acquiring based on the data acquiring process instruction from the data acquiring instruction section, in cases where the sensor, when there has occurred a change in a sensing result, transmits sensing data after the change and that the scheme of the sensing data request signal is a scheme in which the client designates a timing and requests sensing data acquired by the sensor, latest sensing data stored in the memory section at the timing designated by the client; and
a data output section outputting the sensing data acquired by the data processing section to the client.

5. A sensor manager device receiving sensing data transmitted from one or more sensors and providing data based on the sensing data to an external client,
said sensor manager device comprising:
a data receiver section receiving sensing data transmitted from each of the sensors;
a memory section storing the received sensing data;
a signal input section receiving a sensing data request signal transmitted from the client;
a request recognizing section recognizing a scheme of the sensing data request signal and a type of a sensor designated by the client;
a data acquiring instruction section determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

a data processing section determining based on the data acquiring process instruction from the data acquiring instruction section, in cases where the sensor automatically performs sensing and transmits sensing data and that the scheme of the sensing data request signal is a scheme in which the client requests sensing data when there has occurred a change in a sensing result produced by the designated sensor, whether there has occurred a change in the sensing data on the basis of the sensing data stored in the memory section, and when it is determined that there has occurred a change, acquiring sensing data after the change; and a data output section outputting the sensing data acquired by the data processing section to the client.

6. The sensor manager device as set forth in claim 5, wherein the data processing section periodically determines whether there has occurred a change in the sensing data on the basis of the sensing data stored in the memory section.

7. A sensor manager device receiving sensing data transmitted from one or more sensors and providing data based on the sensing data to an external client, said sensor manager device comprising:

a signal output section outputting the sensing signal to each of the sensors;

a data receiver section receiving the sensing data transmitted from the sensor;

a memory section storing the received sensing data;

a signal input section receiving a sensing data request signal transmitted from the client;

a request recognizing section recognizing a scheme of the sensing data request signal and a type of a sensor, designated by the client;

a data acquiring instruction section determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

a data processing section determining based on the data acquiring process instruction from the data acquiring instruction section, in cases where the sensor performs sensing and transmits sensing data in accordance with a sensing signal requesting a transmission of the sensing data and that the scheme of the sensing data request signal is a scheme in which the client requests sensing data when there has occurred a change in a sensing result produced by the sensor, whether there has occurred a change in the sensing data on the basis of the sensing data stored in the memory section, and when it is determined that there has occurred a change, acquiring sensing data after the change; and a data output section outputting the sensing data acquired by the data processing section to the client.

8. The sensor manager device as set forth in claim 7, wherein the signal output section periodically outputs the sensing signal.

9. A method of controlling a sensor manager device receiving sensing data transmitted from one or more sensors and providing data based on the sensing data to an external client, said method comprising the steps of:

(a) receiving sensing data transmitted from each of the sensors;

(b) writing the received sensing data, sensing time information indicating a sensing time of the sensing data, and a unique sensor ID of the sensor transmitting the sensing data in association with each other to a memory section;

(c) receiving a sensing data request signal transmitted from the client;

(d) recognizing a scheme of the sensing data request signal and a type of a sensor designated by the client;

(e) determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

(f) generating, based on the data acquiring process instruction, in cases where the designated sensor automatically performs sensing and transmits sensing data and that the scheme of the sensing data request signal is a scheme in which the client designates a timing and requests sensing data acquired by the designated sensor, the sensing data which is provided by the sensor designated by the client, at the timing designated by the client, on the basis of the sensing data, the sensing time information, and the sensor ID stored in the memory section; and (g) outputting the sensing data generated in step (f) to the client.

10. A method of controlling a sensor manager device receiving sensing data transmitted from one or more sensors and providing data based on the sensing data to an external client, said method comprising the steps of:

(a) receiving sensing data transmitted from each of the sensors;

(b) writing the received sensing data to a memory section;

(c) receiving a sensing data request signal transmitted from the client;

(d) recognizing a scheme of the sensing data request signal and a type of a sensor designated by the client;

(e) determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

(f) acquiring, based on the data acquiring process instruction, in cases where the sensor, when there has occurred a change in a sensing result, transmits sensing data after the change and that the scheme of the sensing data request signal is a scheme in which the client designates a timing and requests sensing data acquired by the sensor, latest sensing data stored in the memory section at the timing designated by the client; and (g) outputting the sensing data acquired in step (f) to the client.

11. A method of controlling a sensor manager device receiving sensing data transmitted from sensors and providing data based on the sensing data to an external client, said method comprising the steps of:

(a) receiving sensing data transmitted from the sensors;

(b) writing the received sensing data to a memory section;

(c) receiving a sensing data request signal transmitted from the client;

(d) recognizing a scheme of the sensing data request signal and a type of a sensor designated by the client;

(e) determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

(f) determining, based on the data acquiring process instruction, in cases where the sensor, automatically performs sensing and transmits sensing data and that the scheme of the sensing data request signal is a scheme in which the client requests sensing data when there has occurred a change in a sensing result produced by the designated sensor, whether there has occurred a change in the sensing data on the basis of the sensing data stored in the memory section, and when it is determined that there has occurred a change, acquiring sensing data after the change; and (g) outputting the sensing data acquired in step (f) to the client.

12. A method of controlling a sensor manager device receiving sensing data transmitted from sensors and providing data based on the sensing data to an external client, said method comprising the steps of:

(a) outputting the sensing signal to the sensors;

(b) receiving the sensing data transmitted from the sensors;

(c) writing the received sensing data to a memory section;

(d) receiving a sensing data request signal transmitted from the client;

(e) recognizing a scheme of the sensing data request signal and a type of a sensor designated by the client;

(f) determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

(g) determining, based on the data acquiring process instruction, in cases where the sensor performs sensing and transmits sensing data in accordance with a sensing signal requesting a transmission of the sensing data and that the scheme of the sensing data request signal is a scheme in which the client requests sensing data when there has occurred a, change in a sensing result produced by the sensor, whether there has occurred a change in the sensing data on the basis of the sensing data stored in the memory section, and when it is determined that there has occurred a change, acquiring sensing data after the change; and (h) outputting the sensing data acquired in step (g) to the client.

13. A computer readable storage medium containing a computer program for controlling a sensor manager device receiving sensing data transmitted from one or more sensors and providing data based on the sensing data to an external client, the computer program, when executed by a computer causing the computer to perform a method comprising the steps of:

(a) receiving sensing data transmitted from each of the sensors;

(b) writing the received sensing data, sensing time information indicating a sensing time of the sensing data, and a unique sensor ID of the sensor transmitting the sensing data in association with each other to a memory section;

(c) receiving a sensing data request signal transmitted from the client;

(d) recognizing a scheme of the sensing data request signal and a type of a sensor designated by the client;

(e) determining a sensing data acquiring process on the basis of the recognized scheme of the sensing data request signal and the recognized type of sensor designated even if the recognized scheme and the recognized type do not match, and providing a data acquiring process instruction corresponding to the determined sensing data acquiring process;

(f) generating, based on the data acquiring process instruction, in cases the designated sensor automatically performs sensing and transmits sensing data and that the scheme of the sensing data request signal is a scheme in which the client designates a timing and requests sensing data acquired by the designated sensor, the sensing data which is provided by the sensor designated by the client, at the timing designated by the client, on the basis of the sensing data, the sensing time information, and the sensor ID stored in the memory section; and (g) outputting the sensing data generated in step (f) to the client.

* * * * *